May 19, 1953     W. G. MICHAELSEN ET AL     2,639,033
DISPLAY TRAY
Filed Feb. 12, 1951
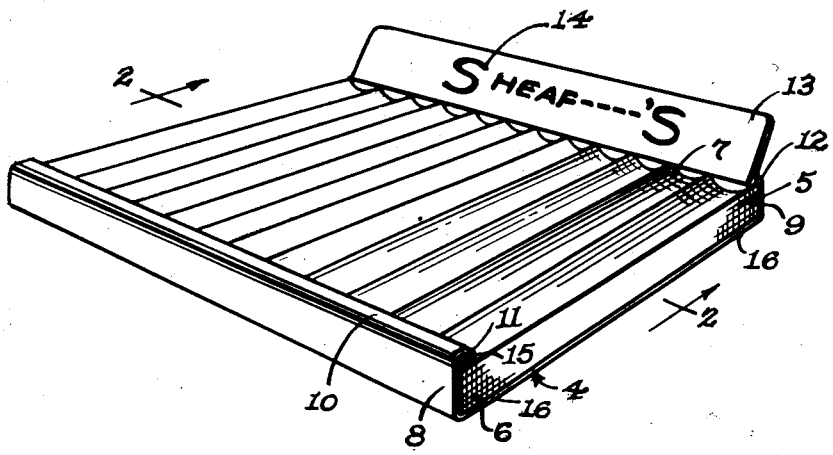
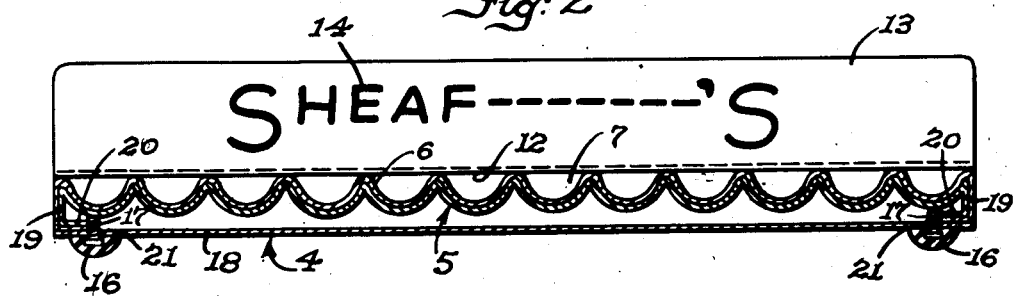
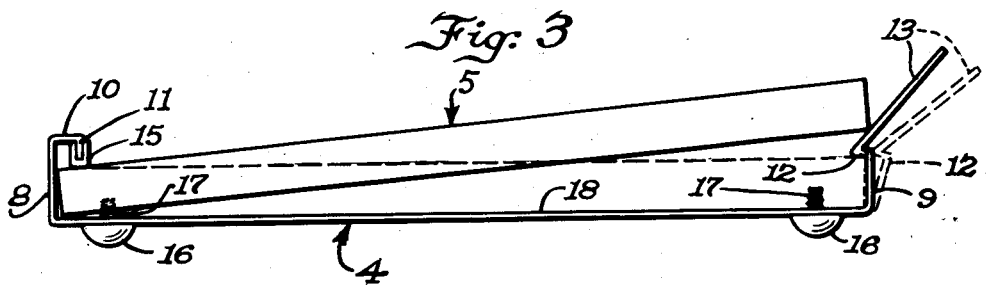
Inventors
William G. Michaelsen
Charles W. Michaelsen
William H. Gerbode
Lawrence E. Dolan
Atty.

Patented May 19, 1953

2,639,033

UNITED STATES PATENT OFFICE 2,639,033

DISPLAY TRAY

William G. Michaelsen, Charles W. Michaelsen, William H. Gerbode, and Lawrence E. Dolan, Rockford, Ill., assignors to Rockford Show Case & Fixture Co., Rockford, Ill., a corporation of Illinois Application February 12, 1951, Serial No. 210,543

10 Claims. (Cl. 206—72)

This invention relates to a new and improved display tray especially designed and adapted for use in displaying fountain pens and pencils, and/or various other small articles.

The principal object of our invention is to provide a tray mainly of light sheet metal construction for durability and economy, and having a cloth covering on the top or rack portion providing the pen and pencil receiving grooves, the body of this rack portion being also formed of light-gauge sheet metal and inserted in the bottom or base portion of the tray in a novel manner, a salient feature of the present tray construction being the utilization of the inclined identifying name-plate portion on the rear end of the base (which also provides a convenient finger grip for use in lifting and moving the tray) as an inclined plane to help deflect the rear wall of the channel defined by said base when the front end of the rack is engaged under a projecting ledge provided on the front wall, whereby the rack is adapted to be snapped into place in the tray and be tightly locked in place under the inherent spring tension of the metal of said base.

Another object of our invention is to provide cushion knobs or feet of rubber, felt or other soft resilient material to support the tray on the glass top of a display case noiselessly and without danger of scratching the glass, these cushion feet being held in place by self-trapping screws which can be molded in place when the feet are made of rubber and entered in holes in the base of the tray, the holes being so located with respect to inturned flanges on the ends of the rack that the screws projecting upwardly alongside the flanges serve to lock the rack in place prohibiting endwise movement thereof in either direction.

Still another object is to provide on the overhanging ledge portion a channelled strip of rubber or other soft resilient material which provides protection for the sharp turned down edge portion of the sheet metal of the base so that it will not cut into the cloth or other covering on the rack that is held in place therebeneath, besides serving as a bumper strip for pen points that may occasionally come in contact with the over-hanging ledge portion when pens are displayed with the caps removed.

The invention is illustrated in the accompanying drawing, in which—

Fig. 1 is a perspective view of a display tray made in accordance with our invention;

Fig. 2 is a cross-section on the line 2—2 of Fig. 1, and

Fig. 3 is an end view indicating the novel manner of assembling, the rack being shown in full lines just prior to being snapped in and in dotted lines in its final assembled position, and the name plate end of the base being indicated in dotted lines in its outwardly deflected or sprung condition.

The same reference numerals are applied to corresponding parts throughout these views.

The display tray comprises a bottom or base portion 4 of one-piece sheet metal construction, and a top or rack portion 5 which is also of one-piece stamped sheet metal construction, except that it has a cloth or other suitable covering, flocking, painting, or plating being also contemplated. When cloth is used, as indicated at 6, it is preferably cemented to the outer face of the sheet metal prior to its being formed to the corrugated or grooved-shape illustrated, thereby insuring the same depth of pocket in each article-receiving trough or groove 7. The base 4 is channel-shaped in longitudinal cross section, providing an upstanding front wall 8 and an upstanding rear wall 9. The front wall 8 has an inturned upper edge portion 10 having a downwardly projecting flange 11 on the edge thereof, defining an over-hanging ledge portion on the front wall 8 to retain the front end portion of the rack 5 therebeneath, as shown in Fig. 1 and as indicated in dotted lines in Fig. 3. The rear wall 9 is bent inwardly to define a shoulder 12 under which the rear end portion of the rack 5 is adapted to be retained, as shown in Fig. 1, and as indicated in dotted lines in Fig. 3. Projecting rearwardly and upwardly from the shoulder 12 is a flange 13 serving as a name plate on which the brand name or trade-mark of the fountain pens or pencils on display may appear, as indicated at 14, and also as a finger grip for use in lifting and moving the tray. This inclined portion 13 also affords an inclined plane down which the front lower edge of the rack 5 is adapted to slide when the rack is snapped into place in the base. The front end portion of the rack is first inserted under the ledge 10—11 and then the rear end portion is pressed down so as to slide down the incline formed by the flange 13 and thereby flex or spring the rear wall 9 outwardly, as indicated in dotted lines in Fig. 3, enough to let the end of the rack 5 enter under the shoulder 12, whereupon the wall 9 snaps back to lock the rack in place, the sheet metal used in the base being sufficiently resilient or springy and thin enough to make this method of assembly practical. The raw edges of the sheet metal of the rack and the cut edges of the cloth covering 6 on the rack are therefore neatly covered up and concealed when the rack is in its assembled position in the base.

A channelled strip 15 of rubber or other soft resilient material is provided covering the full length of the flange 11 and serves a two-fold purpose: It protects the cloth or other covering on the rack from being cut by the sharp edge of the flange 11 and, when the tray is used for pens and pencils, serves as a protective bumper strip against which the writing points of fountain pens displayed with their caps off may come into contact harmlessly, thus preventing damage to the pens and avoiding scratching of the polished plated finish on the tray base.

Cushion knobs or feet 16 of rubber, felt, or other soft resilient material are provided under the four corners of the tray base to protect the glass top on the display case from scratches and to permit placing the trays thereon noiselessly and also without likelihood of slippage. These feet, when of rubber, have molded therein self-tapping screws 17 which permit them to be threaded easily into holes punched in the bottom wall 18 of the base 4. The screws, in addition to holding the feet 16 in place, serve also to retain the rack 5 against endwise displacement from the base 4 in either direction. That is accomplished by providing downwardly bent end walls 19 on the rack 5 having inturned flanges 20 which terminate alongside the holes 21 provided in the bottom wall 18 of the base, so that the screws 17 are disposed next to the flanges 20 and lock the rack 5 against sliding movement in either direction. The screws 17 can be inserted either before or after the rack 5 has been assembled in the base 4.

It is believed the foregoing description conveys a good understanding of the objects and advantages of our invention. The appended claims have been drawn with a view to covering all legitimate modifications and adaptations.

We claim:

1. A display tray comprising a base made of flexible resilient sheet material of rectangular form having upwardly projecting end walls both of which have inwardly projecting top portions, the one inwardly projecting top portion having an inner edge portion projecting upwardly and outwardly at an angle of about 45° to define an inclined name-plate of appreciable width that also serves as an inclined cam plate for wedging engagement of the one end of a display rack thereon, whereby to flex the end walls and spread them sufficiently to admit the aforesaid end of the display rack past the inwardly projecting top portion when the rack is placed in the tray by entry of the other end first under the inwardly projecting top portion of the other end wall, and an article-receiving display rack of rectangular form and of a length slightly less than the distance between said end walls and of a height small enough to fit in said base under said inwardly projecting top portions, said rack being retained in said base between said end walls under said inwardly projecting top portions.

2. A display tray comprising a base of rectangular form made from a single piece of semi-springy sheet metal, the opposite ends of which are bent upwardly to define end walls, both of which have inwardly projecting top portions, the edge portion of the one inwardly projecting top portion having integral therewith a flange of appreciable width extending upwardly and outwardly in inclined relation to the base at an angle of about 45° to define an inclined name-plate of appreciable width that also serves as an inclined cam plate for wedging engagement of the one end of a display rack thereon, whereby to flex the end walls and spread them sufficiently to admit the aforesaid end of the display rack past the inwardly projecting top portion when the rack is placed in the tray by entry of the other end first under the inwardly projecting top portion of the other end wall, and an article-receiving display rack of rectangular form having one end portion engaged under the one inwardly projecting top portion of the base and its other end portion slid under downward pressure down the incline formed by said flange and thereby engaged under the other inwardly projecting top portion.

3. A display tray comprising a base of rectangular form made from a single piece of sheet metal, the opposite ends of which are bent upwardly to define end walls, both of which have inwardly projecting top portions, the edge portion of the one inwardly projecting top portion having integral therewith a flange of appreciable width extending upwardly and outwardly in inclined relation to the base at an angle of about 45° to define an inclined name-plate of appreciable width that also serves as an inclined cam plate for wedging engagement of the one end of a display rack thereon, whereby to flex the end walls and spread them sufficiently to admit the aforesaid end of the display rack past the inwardly projecting top portion when the rack is placed in the tray by entry of the other end first under the inwardly projecting top portion of the other end wall, and a one-piece sheet metal display rack of rectangular form disposed between the end walls of said base under the inwardly bent top portions, said rack being assembled in said base by entry of one end portion under the one inwardly projecting top portion of the base and sliding the other end portion under downward pressure down the incline formed by said flange until engaged under the other inwardly projecting top portion, the sheet metal body of the rack defining a plurality of parallel longitudinal article-receiving troughs the ends of which are overhung by the top portions of the end walls of said base while the open ends of the troughs are closed by the end walls, and the opposite end portions of the sheet metal body of said rack having downwardly projecting vertical end walls on the rack closing the spaces on opposite sides of the base between the end walls thereof.

4. A display tray comprising a base of rectangular form made from a single piece of semi-springy sheet metal, the opposite ends of which are bent upwardly to define end walls, both of which have inwardly projecting top portions, the edge portion of the one inwardly projecting top portion having integral therewith a flange of appreciable width extending upwardly and outwardly in inclined relation to the base at an angle of about 45° to define an inclined name-plate of appreciable width that also serves as an inclined cam plate for wedging engagement of the one end of a display rack thereon, whereby to flex the end walls and spread them sufficiently to admit the aforesaid end of the display rack past the inwardly projecting top portion when the rack is placed in the tray by entry of the other end first under the inwardly projecting top portion of the other end wall, a one-piece sheet metal display rack of rectangular form disposed between the end walls of said base under the inwardly bent top portions, the sheet metal body of the rack defining a plurality of parallel longitudinal article-receiving troughs the ends of which are overhung by the top portions of the end walls of said base while the open ends of the troughs are closed by the end walls, and the opposite end portions of the sheet metal body of said rack having downwardly projecting vertical end walls on the rack closing the spaces on opposite sides of the base between the end walls thereof, said rack having one end portion engaged under the one inwardly projecting top portion of the base and its other end portion slid under downward pressure down the incline formed by said flange and thereby engaged under the other inwardly projecting top portion, and supporting feet attached to the bottom of the base having attaching screws threaded in and projecting upwardly through holes provided in the bottom of said base serving by engagement with the rack to prohibit lateral displacement of the rack relative to the base.

5. A display tray comprising a base of rectangular form made from a single piece of sheet metal, the opposite ends of which are bent upwardly to define end walls, both of which have inwardly projecting top portions, a one-piece sheet metal display rack of rectangular form adapted to fit between the end walls of said base under the inwardly bent top portions, the sheet metal body of the rack defining a plurality of parallel longitudinal article-receiving troughs the ends of which are overhung by the top portions of the end walls of said base while the open ends of the troughs are closed by the end walls, and the opposite end portions of the sheet metal body of said rack having downwardly projecting vertical end walls on the rack closing the spaces on opposite sides of the base between the end walls thereof, and supporting feet attached to the bottom of the base having attaching screws threaded in and projecting upwardly through holes provided in the bottom of said base alongside the end walls on the rack, whereby to prohibit lateral displacement of the rack relative to the base.

6. A display tray comprising a base of rectangular form made from a single piece of sheet metal, the opposite ends of which are bent upwardly to define end walls, both of which have inwardly projecting top portions, a one-piece sheet metal display rack of rectangular form adapted to fit between the end walls of said base under the inwardly bent top portions, the sheet metal body of the rack defining a plurality of parallel longitudinal article-receiving troughs the ends of which are overhung by the top portions of the end walls of said base while the open ends of the troughs are closed by the end walls, and the opposite end portions of the sheet metal body of said rack having downwardly projecting vertical end walls on the rack closing the spaces on opposite sides of the base between the end walls thereof, the end walls of said rack having inwardly projecting flanges on the bottom thereof overlying the bottom of the base, and supporting feet attached to the bottom of the base having attaching screws threaded in and projecting upwardly through holes provided in the bottom of said base alongside the inner edges of the inwardly projecting flanges, whereby to prohibit lateral displacement of the rack relative to the base.

7. A display tray comprising a base of rectangular form made from a single piece of sheet metal, the opposite ends of which are bent upwardly to define end walls, one of which has an inwardly projecting top portion, an article-receiving display rack of rectangular form disposed on said base and having one end portion engaged under the inwardly projecting top portion of the base, said inwardly projecting top portion having a downwardly projecting flange on the edge portion thereof, and a channelled protective covering strip enclosing the edge of said flange in the channel thereof.

8. A display tray comprising a base of rectangular form made from a single piece of sheet metal, the opposite ends of which are bent upwardly to define end walls, one of which has an inwardly projecting top portion, an article-receiving display rack of rectangular form disposed on said base and having one end portion engaged under the inwardly projecting top portion of the base, said inwardly projecting top portion having a downwardly projecting flange on the edge portion thereof, and a channelled protective covering strip enclosing the edge of said flange in the channel thereof, said covering strip being of a material having properties like rubber adapted to serve as a bumper for the writing points of fountain pens displayed in the rack with caps off.

9. A display tray comprising a base of rectangular form made from a single piece of semi-springy sheet metal, the opposite ends of which are bent upwardly to define end walls, both of which have inwardly projecting top portions, the one inwardly projecting top portion having a downwardly projecting flange on the edge portion thereof, a channelled protective covering strip enclosing the edge of said downwardly projecting flange in the channel thereof, the edge portion of the other inwardly projecting top portion having integral therewith a flange of appreciable width extending upwardly and outwardly in inclined relation to the base at an angle of about 45° to define an inclined name-plate of appreciable width that also serves as an inclined cam plate for wedging engagement of the one end of a display rack thereon, whereby to flex the end walls and spread them sufficiently to admit the aforesaid end of the display rack past the inwardly projecting top portion when the rack is placed in the tray by entry of the other end first under the inwardly projecting top portion of the other end wall, and an article-receiving display rack of rectangular form having one end portion engaged under the one inwardly projecting top portion of the base and its other end portion slid under downward pressure down the incline formed by said flange and thereby engaged under the other inwardly projecting top portion.

10. A display tray comprising a base of rectangular form made from a single piece of semi-springy sheet metal, the opposite ends of which are bent upwardly to define end walls, both of which have inwardly projecting top portions, the one inwardly projecting top portion having a downwardly projecting flange on the edge portion thereof, a channelled protective covering strip enclosing the edge of said downwardly projecting flange in the channel thereof, said covering strip being of a material having properties like rubber adapted to serve as a bumper for the writing points of fountain pens displayed in the rack of the tray with caps off, the edge portion of the other inwardly projecting top portion having integral therewith a flange of appreciable width extending upwardly and outwardly in inclined relation to the base at an angle of about 45° to define an inclined name-plate of appreciable width that also serves as an inclined cam plate for wedging engagement of the one end of a display rack thereon, whereby to flex the end walls and spread them sufficiently to admit the aforesaid end of the display rack past the inwardly projecting top portion when the rack is placed in the tray by entry of the other end first under the inwardly projecting top portion of the other end wall, and an article-receiving display rack of rectangular form having one end portion engaged under the one inwardly projecting top portion of the base and its other end portion slid under downward pressure down the incline formed by said flange and thereby engaged under the other inwardly projecting top portion.

WILLIAM G. MICHAELSEN.
CHARLES W. MICHAELSEN.
WILLIAM H. GERBODE.
LAWRENCE E. DOLAN.

References Cited in the file of this patent

UNITED STATES PATENTS

| Number | Name | Date |
|---|---|---|
| 434,040 | Andrews | Aug. 12, 1890 |
| 600,879 | Louden | Mar. 22, 1898 |
| 1,883,012 | Shields | Oct. 18, 1932 |
| 1,916,238 | Soffel | July 4, 1933 |
| 2,026,967 | Devine | Jan. 7, 1936 |
| 2,435,873 | Crary | Feb. 10, 1948 |
| 2,449,727 | Sloane | Sept. 21, 1948 |